United States Patent [19]

Imura

[11] 4,238,153
[45] Dec. 9, 1980

[54] AUTOMATIC FOCUS ADJUSTING DEVICE FOR CAMERAS

[75] Inventor: Toshinori Imura, Sakai, Japan

[73] Assignee: Minolta Camera Kabushiki Kaisha, Osaka, Japan

[21] Appl. No.: 6,176

[22] Filed: Jan. 24, 1979

[30] Foreign Application Priority Data

Feb. 4, 1978 [JP] Japan .................................. 53-11779
Jun. 21, 1978 [JP] Japan .................................. 53-75892

[51] Int. Cl.³ .......................... G03B 3/10; G03B 13/20
[52] U.S. Cl. ........................................ 354/195; 354/149
[58] Field of Search ..................... 354/25, 32, 27, 139, 354/149, 163, 165, 195, 289, 127, 128; 352/140

[56] References Cited
U.S. PATENT DOCUMENTS

| | | | |
|---|---|---|---|
| 3,547,017 | 12/1970 | Harvey | 354/25 X |
| 3,617,128 | 11/1971 | Harvey | 354/163 X |
| 3,618,499 | 11/1971 | Harvey | 354/25 X |
| 3,917,395 | 11/1975 | Ogawa | 354/195 |
| 4,146,316 | 3/1979 | Osawa | 354/25 |
| 4,154,517 | 5/1979 | Tamura | 354/25 |

Primary Examiner—Richard A. Wintercorn
Assistant Examiner—William B. Perkey
Attorney, Agent, or Firm—Watson, Cole, Grindle & Watson

[57] ABSTRACT

A camera selectively settable to a daylight photography mode and to a flash photography mode includes an automatic focus adjusting device having a range finder for generating a distance signal representative of a distance from the camera to an aimed object, and an objective setting mechanism responsive to the distance signal for setting the objective to a proper focus of the aimed object. A control circuit responsive to the selection of the photographic modes causes the objective setting mechanism to set the camera objective at a position where the objective focuses on an object located at a predetermined distance zone within the maximum permissible distance for flash photography, upon selection of the flash photography mode. The control circuit may have a switch which causes the objective setting mechanism to effect the above setting of the objective in preference to the existence of the distance signal upon selection of the flash photography mode. Alternatively, the control circuit may have a conditioning circuit which conditions the objective setting mechanism such that, upon selection of the flash photography mode, the objective setting mechanism effects the above setting of the objective either when the distance signal is representative of a distance beyond the maximum permissible distance for flash photography or when the range finder generates no distance signal because of too low brightness of the scene.

15 Claims, 5 Drawing Figures

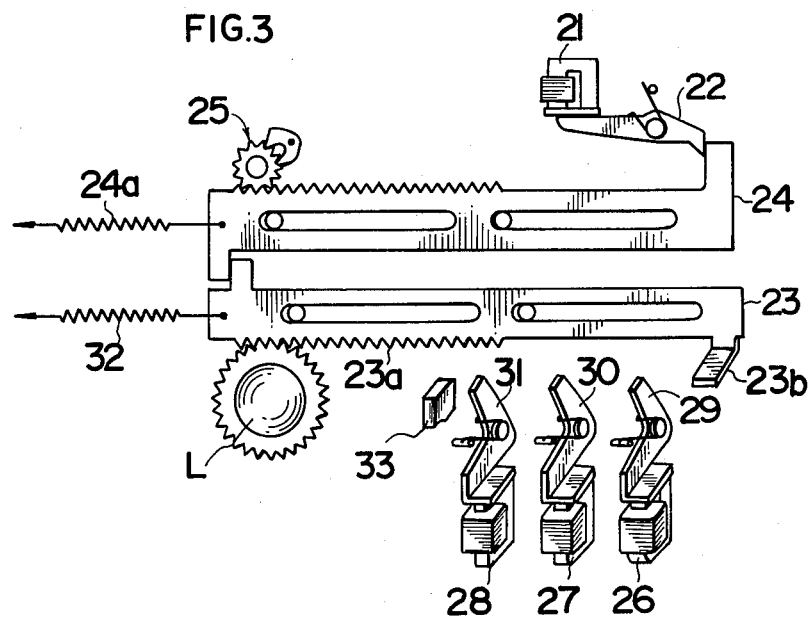
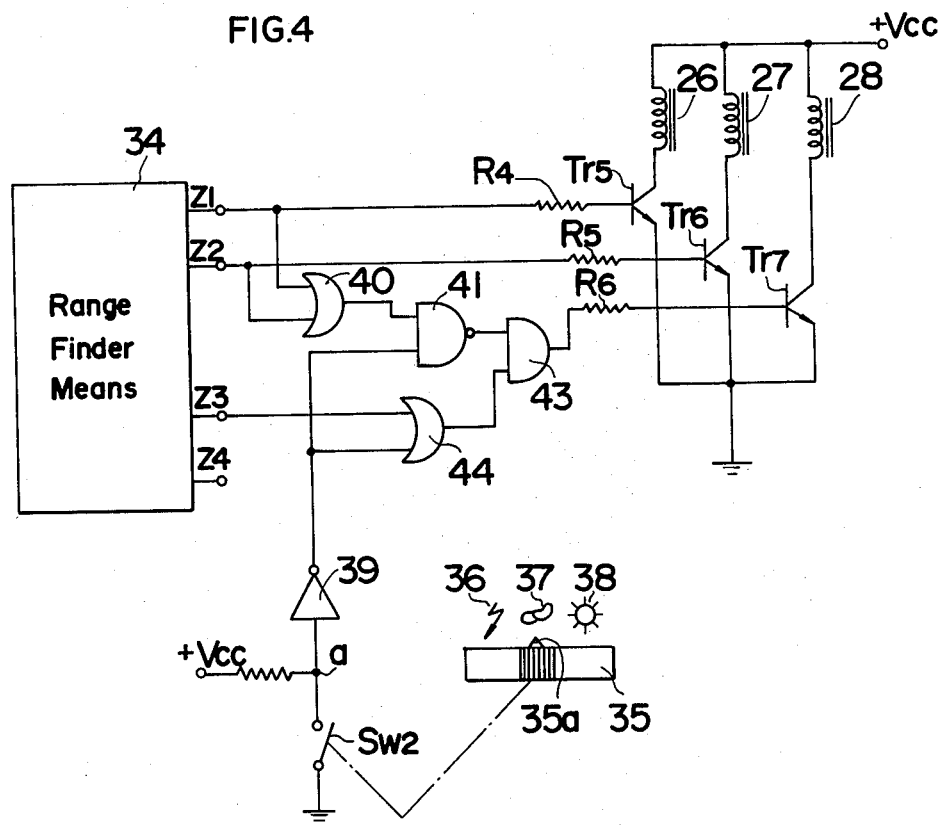

AUTOMATIC FOCUS ADJUSTING DEVICE FOR CAMERAS

BACKGROUND OF THE INVENTION

The present invention relates generally to automatic focus adjusting cameras, and more particularly to an automatic focus adjusting device for use in such cameras which have a built-in electronic flash device, or on which an electronic flash device is mountable.

Generally, when scene brightness is so low that artificial illumination is required, it may be difficult for an automatic focus adjusting device to detect a focus condition, resulting in automatic focus adjustment failure. When, on such an occasion, focus adjustment is carried out by the automatic focus adjusting device, an objective lens is set to an extreme position at the nearest distance, or infinity, whatever position an object is located at, thus resulting in a photograph out of focus for the object. Yet, firing of a flash device after such accidental focus adjustment may result in a photograph with overexposure or underexposure for the object because of too much or too little illumination on the object.

SUMMARY OF THE INVENTION

It is an object of the present invention to provide an automatic focus adjusting device for the camera of the described type, which, by common use of objective setting means provided for daylight photography, can set an objective of the camera at a position where the objective focuses on an object within the scene which is located within the maximum permissible distance for flash photography in the case where the object is so dark that a range finder cannot generate any distance signal.

Another object of the present invention is to provide an automatic focus adjusting device which can effect the above setting of the objective as well in the case where the distance signal generated by the range finder is representative of a distance being farther than the maximum permissible distance for flash photography.

Still another object of the present invention is to provide an automatic focus adjusting device which can automatically effect the above setting of the objective in response to the setting of the camera to the flash photography mode.

Yet another object of the present invention is to provide an automatic focus adjusting device of the described type in which the distance to an object on which the objective focuses upon selection of the flash photography mode is variable in accordance with the value of an exposure factor for the flash photography such as film sensitivity and a guide number of an electronic flash device to be used with the camera.

To accomplish these objects, an automatic focus adjusting device of the present invention includes control means responsive to the selection of the photographic modes as well as range finder means for generating a distance signal representative of a distance from the camera to an aimed object within the scene, and objective setting means responsive to the distance signal for setting the objective at a position where the objective focuses on the aimed object. Upon selection of the flash photography mode, the control means causes the objective setting means to set the camera objective at a position where the objective focuses on an object being away from the camera by a predetermined distance within the maximum permissible distance for flash photography.

With the above construction, even when the brightness of the scene is too low for normal range finding, i.e., when the range finder means cannot generate any distance signal, or when the aimed object is too far from the camera for flash photography with an optimum exposure, i.e., when the distance to the aimed object is farther than the maximum permissible range for flash photography, firing of an electronic flash device allows a picture to be taken in which at least a part of the scene located at the predetermined distance from the camera is in focus and with an optimum exposure, thus ensuring a generally reasonable or satisfactory photograph.

According to the present invention, the objective setting means may have a drive member, an objective shifting member for shifting the objective for focusing, and an electromagnetic device for each of the distance zones. Each of the electromagnetic devices is actuated for arresting the objective shifting member at a position where the objective focuses on an object within the scene located at the corresponding zone. The objective setting means may further have an actuating circuit for selectively actuating one of the electromagnetic devices in accordance with the distance signal such that the distance zone in which the distance represented by the distance signal falls corresponds to the actuated electromagnetic device.

In one preferred embodiment of the present invention, the control means includes circuit means responsive to the selection of the photographic modes for causing the actuating circuit to actuate one of the electromagnetic devices corresponding to the predetermined distance zone within the maximum permissible distance for flash photography, in preference to the existence of the distance signal upon the selection of the flash photography mode. Thus, in this embodiment, whenever the camera operator selects the flash-photography mode, the above setting of the objective for flash photography is automatically made irrespective of the scene brightness and a distance from the camera to the aimed object.

In another embodiment of the present invention, the control means includes a conditioning circuit which generates a conditioning signal representative of the selected photographic mode. The conditioning circuit is connected to the actuating circuit such that the conditioning signal causes the actuating circuit to actuate one of the electromagnetic devices corresponding to a predetermined distance zone within the maximum permissible distance for flash photography, upon the selection of the flash photography mode. Yet, the range finder means is connected to the actuating circuit such that the distance signal is not input to the actuating circuit so that none of the electromagnetic devices are actuated when the distance signal is representative of a distance which is farther than any of the distance zones. Thus, the above setting of the objective for flash photography is made in response to the selection of the flash photography mode either when the distance signal is representative of too far a distance for flash photography, or when the range finder means cannot generate any distance signal because of too low brightness of the scene.

In still another embodiment of the present invention, which is similar to the second embodiment, a setting member is provided which is manually operable to set an exposure factor such as film sensitivity and guide number of an electronic flash device to be used with the camera to a plurality of different values. The control means includes a conditioning circuit which generates a conditioning signal representative of both the selected photographic mode and the set value of the exposure factor. The conditioning circuit is connected to the actuating circuit such that the conditioning signal, upon selection of the flash photography mode, causes the actuating circuit to selectively actuate one of the electromagnetic devices, which correspond to predetermined distance zones within the maximum permissible distance for flash photography, in accordance with the set value of the exposure factor.

The above and other objects and features of the present invention will become more apparent from the following description taken in connection with the accompanying drawings.

BRIEF DESCRIPTION OF THE DRAWINGS

FIG. 3 is a perspective view illustrating the mechanical part of a second embodiment of the present invention;

FIG. 4 is an electric circuit diagram for the embodiment of FIG. 3; and

DESCRIPTION OF PREFERRED EMBODIMENTS

Automatic focus adjustment in the embodiments to be described is based on a so-called zone-focus system. That is, the range finder device detects which of the near, middle and distant zones an object is placed in, and in response to the result, the objective lens positioning control mechanism sets an objective lens to the correct zone for the object.

Figure 1:
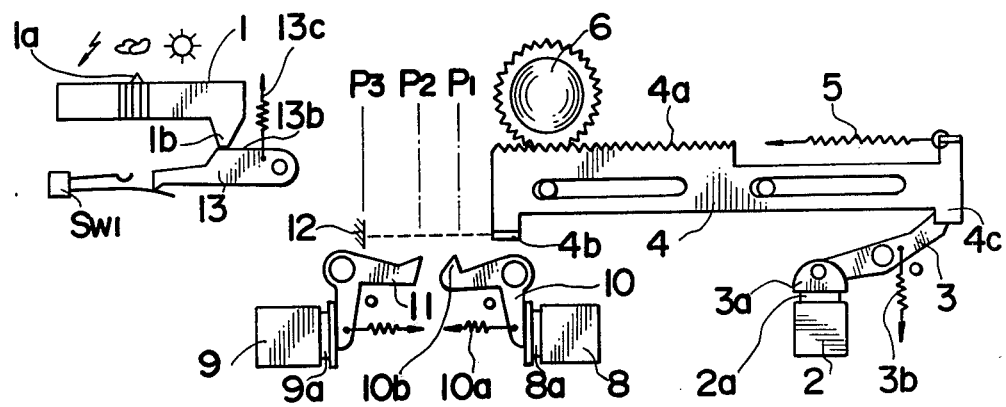
FIG. 1 is a front view illustrating the mechanical part of a first embodiment of the present invention.

Referring now to FIG. 1, which shows the mechanical part of a first embodiment of the present invention, manual changeover member 1 for daylight photography and flash photography is set to the daylight photography mode of a camera with index 1a projecting from the center of the top surface of the member being set at the cloud symbol. In this condition, projection 1b facing downward at the right end of changeover member 1 rides on shoulder 13b on the top surface of lever 13, rotating lever 13 counterclockwise against the action of spring 13c, whereby the left end of lever 13 abuts on switch Sw1 which is, in turn, opened, thus causing an automatic focus adjusting device to operate properly. Lens shift member 4 is biased left by spring 5, and stop portion 4c at the right end of lens shift member 4 is restrained by lever 3. Provided at the left end of lever 3 is armature 3a which is normally attracted and held to electromagnet 2, core 2a of which is a permanent magnet, and lever 3 maintains lens shift member 4 to be restrained at the position illustrated in FIG. 1. When the winding of electromagnet 2 is instantly energized by the operation of a release member (not shown), e.g. a shutter button, the attractive force of permanent magnet core 2a is offset to free armature 3a, causing lever 3 to rotate clockwise under the action of spring 3b, whereby lever 3 disengages from stop portion 4c of lens shift member 4, which in turn starts travelling to the left by the action of spring 5. Provided on the top side of lens shift member 4 is rack 4a which engages with gear 6 on the outer circumference of the lens barrel for objective lens L. Accordingly, the travelling of lens shift member 4 to the left causes the lens barrel to rotate clockwise, thus causing objective lens L to be retracted from the nearest zone toward the infinity zone (the reverse may also be used). At the same time, a range finder device (not shown) operates to detect which of the near, middle and distant zones an object is located in, and in response to that determination, electromagnet 8 is energized when the object is located in the near zone, and electromagnet 9 is energized when the object is in the middle zone, while neither electromagnet 8 or 9 is energized when the object is in the distant zone. Electromagnets 8 and 9, both having permanent magnet cores which normally attract and hold armatures, are of the type in which the instant energization of a winding offsets the attractive force to release the armature. When the object is in the near zone, the winding of electromagnet 8 is energized, causing lever 10 to be released and rotated clockwise by the action of spring 10a, and claw 10b at the left end of lever 10 projects into the left travelling path of engaging portion 4b of lens shift member 1. When engaging portion 4b comes into engagement with claw 10b of lever 10, lens shift member 4 is stopped at position P1. In this manner, objective lens L is set to the near distance zone. Further, when the object is in the middle zone, the winding of electromagnet 9 is energized to release lever 11, which steps lens shift member 4 when the left end thereof is positioned at P2, objective lens L thus being set to the middle distance zone. With the object in the distant zone, however, neither of electromagnets 8 or 9 is energized, permitting lens shift member 4 to move until its left end comes into contact with fixed stopper 12, whereby lens shift member 4 is stopped at position P3, objective lens L thus being set to the distant zone.

Figure 2:
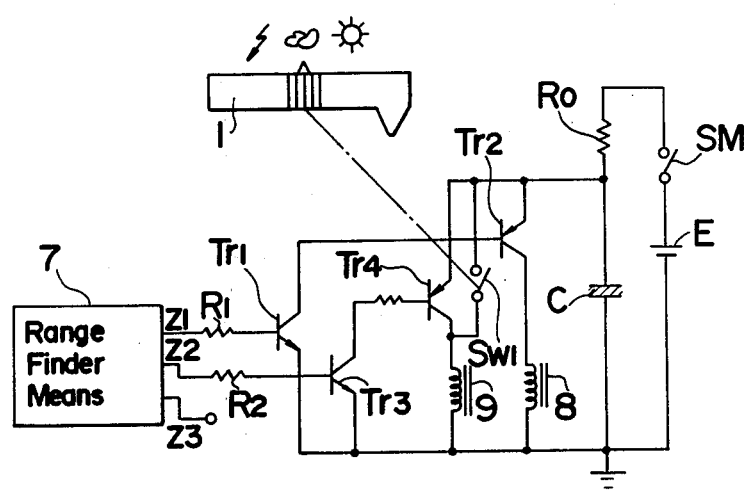
FIG. 2 is an electric circuit diagram for the embodiment of FIG. 1.

FIG. 2 illustrates an automatic focus adjusting circuit for operating electromagnets 8 and 9. Portions 8 and 9 correspond to electromagnets 8 and 9, respectively. Range finder device 7 generates a high level signal at terminal Z1 when an object is located in the near zone, a high level signal at terminal Z2 when the object is in the middle zone, and a high level signal at terminal Z3 when the object is in the distant zone, respectively. Terminal Z1 is connected to the base of transistor Tr1, and when the signal at terminal Z1 becomes a high level, transistor Tr1 is turned on, and so is transistor Tr2. With transistor Tr2 turned on, capacitor C, charged by power source E beforehand, is discharged through transistor Tr2 and the winding of electromagnet 8, the latter of which is instantly energized. Similarly, when a high level signal appears at terminal Z2, transistors Tr3 and Tr4 are turned on because switch Sw1 connected in parallel with transistor Tr4 is normally opened, thereby causing the winding of electromagnet 9 to be instantly energized. It is to be noted that power source switch SM is closed at the initial stage of the shutter button depression.

When changeover member 1 in FIG. 1 is turned to the flash photography position marked with an electronic flash arrow, switch Sw1 is closed. This causes switch Sw1 to short-circuit the emitter and collector of transistor Tr4 in FIG. 2, whereby electromagnet 9 is energized independently of the operation of range finder device 7 so that objective lens L is always set to the middle zone. In the above embodiment, the automatic focus adjusting device is forced to remain inoperative in the case of flash photography. That is, when switch Sw1 is closed, capacitor C is continuously short-circuited by the winding of electromagnet 9, resulting in no remaining power strong enough to energize electromagnet 8 even if a high level signal is generated at terminal Z1 of range finder device 7.

In the above construction, the objective lens is set to a position suitable for flash photography in association with a changeover to flash photography. This fact causes no failure in picture taking even if normal range finding and automatic focus adjustment are impossible due to too low scene brightness, thus ensuring a generally reasonable photograph with a minimum number of additional members.

Needless to say, the embodiment of the present invention may be applied when zone settings of automatic focus adjustment are made in a greater number of stages, or continuously.

FIGS. 3 and 4 illustrate a second embodiment of the present invention. Referring to FIG. 3 in explaining the mechanical part of the embodiment, electromagnet 21 controls the stop of release operating member 24 by stop lever 22. Objective lens L is shifted in the direction of the optical axis by rack 23a cut on lens shift member 23. Slow governor 25 controls the shift speed of release operating member 24. Lens shift member 23 is biased left by spring 32, as shown in FIG. 3, from the position where objective lens L is focused on an object at the near zone to the position where objective lens L is focused on an object at the distant zone. However, lens shift member 23 is constructed to follow the movement of release operating member 24, and when release operating member 24 is cocked in the right direction, for example, in association with shutter charging, lens shift member 23 is pushed by release operating member 24 to reach the position as illustrated in FIG. 3. When release operating member 24 is released from its restrained position effected by stop lever 22, release operating member 24 moves left under the action of spring 24a to release the shutter (not shown) at its final stage. Electromagnet 21 having a permanent magnet at its core normally holds stop lever 22 in the stop position illustrated in FIG. 3 by the magnetic force of its permanent magnet. With an operating member (not shown), e.g. a shutter button, operated, the winding of electromagnet 21 is energized to generate magnetic force which offsets the magnetic force of the permanent magnet, whereby stop lever 22 is rotated counterclockwise by its spring force to release the stop of release operating member 24.

Electromagnets 26, 27 and 28 are provided in pairs to stop levers 29, 30 and 31, each of which is spring tensioned to be away from the core of each electromagnet. Electromagnets 26, 27 and 28 are designed to determine the stop position of lens shift member 23 and are of the type identical to electromagnet 21, and normally maintain corresponding stop levers 29, 30 and 31 in their inoperative positions by the magnetic force of permanent magnets included in the respective cores, i.e. out of the path of engaging projection 23b formed on lens shift member 23. With their windings energized, electromagnets 26, 27 and 28 release corresponding stop levers 29, 30 and 31 from their restrained positions. Released stop levers 29, 30 and 31 are rotated clockwise by spring force to be brought into the path of engaging projection 23b. As a result, lens shift member 23 is respectively stopped at the position where objective lens L is set to the near zone when the winding of electromagnet 26 is energized, at the position where objective lens L is set to the first middle zone when the winding of electromagnet 27 is energized, and at the position where objective lens L is set to the second middle zone more distant than the first middle zone when the winding of electromagnet 28 is energized. It should be understood that when none of electromagnets 26, 27 and 28 are energized, lens shift member 23 is stopped in engagement with projection 33 provided integrally on the camera body at the left of electromagnet 28, thereby setting objective lens L to the more distant zone.

With respect to FIG. 4, range finder device 34 may have the construction described, for example, in U.S. Pat. No. 3,945,023 for the embodiment of the present invention in which the distance of an object is divided into four zones and a high level signal is generated respectively at terminal Z1 for an object in the near zone, at terminal Z2 for an object in the first middle zone, at terminal Z3 for an object in the second middle zone and at terminal Z4 for an object in the distant zone. Manual changeover member 35 is designed to select either daylight photography or flash photography, and setting index 35a at flash symbol 36 makes it possible for the camera to be set to the flash photography mode. With index 35a set at either symbol 37 or 38 for daylight photography, the camera can be set to the daylight photography mode, with the diaphragm (not shown) being set at either of two-step aperture sizes. Switch Sw2 operates in association with manual changeover member 35, and is closed when index 35a is set at flash symbol 36 while it is opened at the other setting positions of manual changeover member 35. Inverter 39 and high potential power source +VCC constitute a conditional circuit together with switch Sw2, and the potential at node a becomes a high level when switch Sw2 is opened, and it becomes a low level when switch Sw2 is closed.

The windings of electromagnets 26, 27 and 28 are connected in series respectively to transistors Tr5, Tr6 and Tr7 but are in parallel connection to high potential power source +VCC, and the bases of transistors Tr5 and Tr6 are connected through resistors R4 and R5 respectively to terminals Z1 and Z2. OR circuit 40 receives the outputs at terminals Z1 and Z2, NAND circuit 41 receives the outputs of OR circuit 40 and inverter 39, and OR circuit 44 receives the outputs at terminal Z3 and of inverter 39. AND circuit 43 receives the outputs of NAND circuit 41 and OR circuit 44, and the base of transistor Tr7 is connected through resistor R6 to the output terminal of AND circuit 43.

It should be noted that the relations between the operating member (e.g. a shutter button), range finder device 34 and electromagnet 21 in the embodiment are detailed below, although they are not illustrated. That is, a switch (not shown) is closed by the operation of the operating member, causing range finder device 34 to start operating. At the same time, after a predetermined lapse of time including the time required for range finder device 34 to complete its operation since the closure of the switch, the winding of electromagnet 21 is energized through the function of a delay circuit (not shown).

Further in the above embodiment, lens shift member 23 is associated with a known F.M. mechanism (which automatically determines the diaphragm aperture commensurate with a photographic zone and which is not shown), and with manual changeover member 35 is set to the flash photography mode, i.e. only with index 35a set at symbol 36, the diaphragm aperture is determined for objective lens L in response to the setting position of lens shift member 23. This is, however, due to the use of a manual strobo having a predetermined guide number as a flash device, and when a so-called automatic electronic flash device is used, the above mentioned F.M. mechanism is not required.

In the operation of the embodiment comprising the above construction, manual changeover member 35 is first, in the case of daylight photography, set to a position where index 35a is set to symbol 37 or 38, causing switch Sw1 to be opened and inverter 39 to generate a low level signal as a conditional signal.

With the operating member (not shown) operated in this condition, range finder device 34 begins operating, thus generating a high level signal at one of terminals Z1, Z2, Z3 and Z4. With an object in the near zone, for example, a high level signal appears at terminal Z1, turning on transistor Tr5 which energizes the winding of electromagnet 26 for its activation. However, transistor Tr6 is maintained off, and OR circuit 40 and NAND circuit 41 generate high level signals while OR circuit 40 and AND circuit 43 generate low level signals, and as a result, transistor Tr7 is also maintained off. In this case, therefore, stop lever 29 is brought into the path of engaging projection 23b.

When an object is placed in the second middle zone, a high level signal appears at terminal Z2, turning on transistor Tr6 which activates electromagnet 27, whereby stop lever 30 is brought into the path of engaging projection 23b. Transistor Tr5 is maintained off, and OR circuit 40 and NAND circuit 41 generate high level signals while OR circuit 44 and AND circuit 43 generate low level signals, thereby causing transistor Tr7 also to remain shut off.

With an object in the second middle zone, a high level signal appears at terminal Z3 and transistors Tr5 and Tr6 are maintained off. Circuits 41, 44 and 43 other than OR circuit 40 generate high level signals which turn on transistor Tr7, thereby activating electromagnet 28, whereby stop lever 31 is brought into the path of engaging projection 23b.

Further, with an object in the distant zone, a high level signal appears at terminal Z4. Since terminal Z4 is a floating terminal, however, its high level signal is applied as an input to none of the above circuits. However, low level signals are generated at terminals Z1, Z2 and Z3, whereby transistors Tr5 and Tr6 are maintained off. Also, low level signals are generated from circuits 40, 44 and 43 other than NAND circuit 41, causing transistor Tr7 also to remain shut off. As a result, stop levers 29, 30 and 31 are all maintained at the positions illustrated in FIG. 3.

When range finder device 34 generates a high level signal at one of terminals Z1, Z2, Z3 and Z4 as described above, the winding of electromagnet 21 is almost simultaneously energized for its activation. As a result, release operating member 24 is released from its restrained condition effected by stop lever 22, thus being moved leftward by the action of spring 24a, and lens shift member 23 follows the movement of release operating member 24 under the action of spring 32. During its movement, lens shift member 23 is stopped when projection 23b comes into contact with any one of stop levers 29, 30 and 31 or projection 33, whereby objective lens L is set to the lens shift position commensurate with the stop position of lens shift member 23. Release operating member 24, however, continues to move leftward after lens shift member 23 has been stopped, to release the shutter (not shown) at its final step, thus commencing photography.

As described above, with daylight photography selected, objective lens L is automatically focused on an object detected by range finder device 34, thus ensuring an appropriate focus. When manual changeover member 35 is set to the position where index 35a matches symbol 36 to effect flash photography, switch Sw2 is closed and inverter 39 generates a high level signal as a conditional signal.

If a high level signal appears at none of terminals Z1, Z2 and Z3 under this condition, in other words, when an object is placed in the distant zone, or when an object is too dark for range finder device 34 to detect the distance of the object, transistors Tr5 and Tr6 are maintained off, and circuits 41, 44 and 43, other than OR circuit 40, generate high level signals. Therefore, transistor Tr7 alone is turned on to activate electromagnet 28, whereby lens shift member 23 is restrained by stop lever 31 from moving to the left. That is to say, in this case, objective lens L is focused on the second middle zone, thus assuring a photograph which is not extremely out of focus and underexposed for an object in the distant zone and which is of appropriate focus and exposure at least for an object in the second middle zone permitting flash photography, whereby a generally satisfactory photograph is available.

Even with flash photography selected, objective lens L is accurately set to the position where it is focused on any of the near, first middle, second middle and distant zones, similar to daylight photography, if a high level signal appears at any one of terminals Z1, Z2 and Z3, and photography with proper focus and exposure is made possible. That is, when a high level signal appears at terminal Z1, transistor Tr6 is maintained off while transistor TR5 is turned on to activate electromagnet 26. Also, circuits 41 and 43, other than OR circuits 40 and 44, generate low level signals, thus maintaining transistor Tr7 off. When a high level signal appears at terminal Z2, however, transistor Tr5 is maintained off while transistor Tr6 is turned on to activate electromagnet 27. Similarly, circuits 41 and 43, other than OR circuits 40 and 44 generate low level signals, thus maintaining transistor Tr7 also off. Further, when a high level signal appears at terminal Z2, transistors Tr5 and Tr6 are maintained off, and circuits 41, 44 and 43, other than OR circuit 40, generate high level signals. Accordingly, transistor Tr7 alone is turned on to activate electromagnet 28.

It is to be noted that in the case of flash photography, a flash device (not shown) is supplied with power, for example, by setting manual changeover member 35 to the flash photography mode and flashes in synchronization with the shutter opening in a well-known manner.

Figure 5:
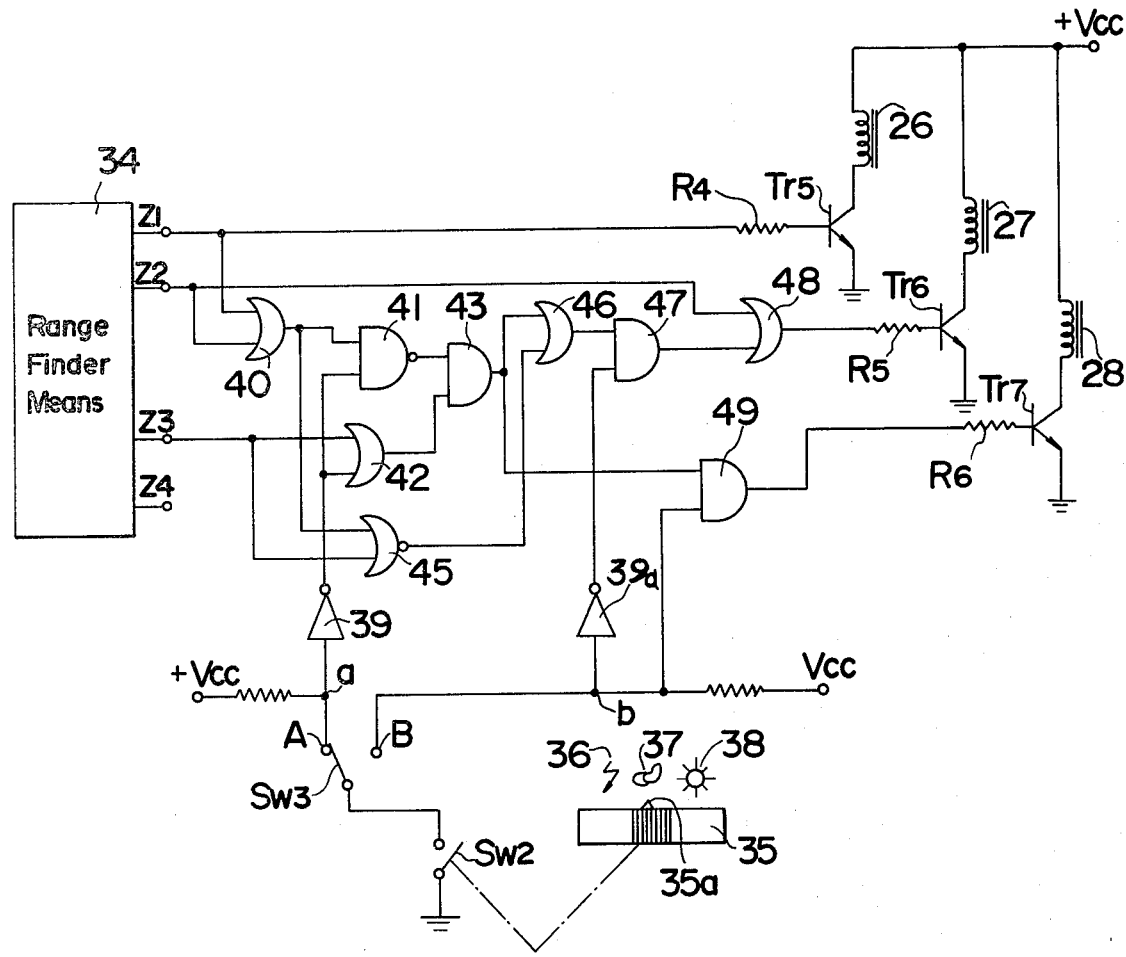
FIG. 5 is an electric circuit diagram of a third embodiment of the present invention.

FIG. 5 is a third embodiment of the present invention in which the circuit of FIG. 4 is modified so that in response to film sensitivity setting or guide number setting of the flash device, the setting position of an objective lens is automatically altered when an object is placed in the more distant zone than the maximum permissible range for flash photography, or when range finder device 34 cannot detect the distance of an object.

Referring to FIG. 5, changeover switch Sw3 is changed either to terminal A or B by film sensitivity setting or the guide number setting of a flash device. Changeover switch Sw3 is changed to terminal A when the film sensitivity is high or the guide number is great, and to terminal B when the film sensitivity is low or the guide number is small. Terminal B is connected to inverter 39a, as well as to high potential power source +VCC through a resistor, similar to terminal A, and the potential at node b is at a low level only when switch Sw2 is closed and switch Sw3 is on terminal B. That is to say, in the embodiment, switches Sw2 and Sw3, inverters 39 and 39a, and high potential power source +VCC together constitute a conditional circuit.

NOR circuit 45 receives the outputs of OR circuit 40 and terminal Z3, and OR circuit 46 receives the outputs of AND circuit 43 and NOR circuit 45, AND circuit 47 receives the outputs of NOR circuit 46 and inverter 44, and OR circuit 48 receives the outputs at terminal Z2 and of AND circuit 47. The output of AND circuit 43 is connected to the base of transistor Tr6. Additionally, AND circuit 49 receives the outputs of AND circuit 43 and node b, and the output of AND circuit 49 is connected to the base of transistor Tr7.

In the above embodiment, switch Sw2 is opened for daylight photography, and inverters 39 and 44 generate low level signals as a conditional signal independently of the setting of changeover switch Sw3.

With a high level signal appearing at terminal Z1, transistor Tr5 is turned on to activate electromagnet 26. Since OR circuit 40 and NAND circuit 41 generate high level signals while OR circuits 42, 46 and 48, AND circuits 47 and 49, NOR circuit 45 and AND circuit 43 generate low level signals, transistors Tr6 and Tr7 are maintained off. With a high level signal appearing at terminal Z2, transistor Tr5 is maintained off, and OR circuits 40 and 48, as well as NAND circuit 41 generate high level signals while OR circuits 42 and 46, AND circuits 43, 47 and 49 as well as NOR circuit 45 generate low level signals. Therefore, transistor Tr6 is turned on and transistor Tr7 is maintained off, resulting in the activation of only electromagnet 27. When a high level signal appears at terminal Z3, transistor Tr5 is similarly maintained off, and OR circuits 40 and 48, NOR circuit 45 and AND circuit 47 generate low level signals, while NAND circuit 41, OR circuits 42 and 46 as well as AND circuits 43 and 49 generate high level signals. Accordingly, transistor Tr7 is turned on, and transistor Tr6 is maintained off, resulting in the activation of only electromagnet 28. Further with a high level signal appearing at terminal Z4, NAND circuit 41, NOR circuit 45 and OR circuit 41 alone generate high level signals and all other circuits 40, 42, 43, 47, 48 and 49 generate low level signals. Therefore, not only transistor Tr5 but also transistors Tr6 and Tr7 are all maintained off, whereby all of electromagnets 26, 27 and 28 are maintained deenergized. That is, in the case of daylight photography, objective lens L is alternatively set to one of the near, first middle, second middle and distant zones through the controls of electromagnets 26, 27 and 28, as detailed above.

Moreover, when changeover switch Sw3 is at terminal A and switch Sw2 is closed to effect flash photography, inverter 39 generates a high level signal while inverter 39a generates a low level signal. These signals in pairs become a conditional signal.

In this condition, when a high level signal appears at none of terminals Z1, Z2 and Z3, transistor Tr5 is maintained shut off, and OR circuits 40 and 48, and AND circuit 47 generate low level signals while NAND circuit 41, OR circuits 42 and 46, NOR circuit 45 and AND circuits 43 and 49 generate high level outputs. Therefore, transistor Tr6 is maintained off while transistor Tr7 is turned on to activate electromagnet 28. That is, upon activation of electromagnet 28, objective lens L is set to the position where it is focused on an object in the second middle zone, resulting in a photograph which is not extremely out of focus and underexposed for an object even when placed in the distant zone, and ensuring proper exposure and focus for the field of an object at least in the second middle zone.

On the contrary, with a high level signal appearing at terminal Z1, transistor Tr5 is turned on to activate electromagnet 26. At this time, circuits 41, 43, 45, 46, 47, 48 and 49, other than OR circuits 40 and 42, generate low level signals, thereby maintaining transistors Tr6 and Tr7 off. Further, with a high level signal appearing at terminal 22, transistor Tr5 is maintained off and OR circuits 40, 42 and 48 generate high level signals while the other circuits 41, 43, 45, 46, 47 and 49 generate low level signals. Therefore, transistor Tr7 is also maintained off while transistor Tr6 is turned on to activate electromagnet 27. Additionally, when a high level signal appears at terminal Z3, transistor Tr5 is similarly maintained off, and OR circuits 40 and 48, NOR circuit 45 and AND circuit 47 generate low level signals while OR circuits 42 and 46, NAND circuit 41 and AND circuits 43 and 49 generate high level signals. Therefore, transistor Tr6 is maintained off, while transistor Tr7 is turned on to activate electromagnet 28. That is, when a high level signal appears at any one of the terminals Z1, Z2 and Z3, objective lens L is accurately set to one of the near, first middle and second middle zones through the controls of electromagnets 26, 27 and 28, similar to daylight photography, so that it is focused on an object placed in the zone, thus enabling a proper focus and correct exposure for an object to be photographed.

However, with changeover switch Sw3 at terminal B, and switch Sw2 closed to effect flash photography, inverter 39 generates a low level signal while inverter 39a generates a high level signal.

When a high level signal appears at none of the terminals Z1, Z2 and Z3 under this condition, transistor Tr5 is maintained off, and OR circuits 40 and 42 and AND circuits 43 and 49 generate low level signals while NAND circuit 41, NOR circuit 45, OR circuits 46 and 48 and AND circuit 47 generate high level signals. Accordingly, transistor Tr7 is also maintained off, while transistor Tr6 is turned on to activate electromagnet 27. Further, with a high level signal appearing at terminal Z3, circuits 41, 42, 43, 46, 47 and 48, other than OR circuit 40, AND circuit 49 and NOR circuit 45 generate high level signals, and similar to the above, transistor Tr6 alone is turned on to activate electromagnet 27. That is to say, when an object is placed in the zone more distant than the second middle zone or when range finder device 34 cannot detect the distance of an object to be photographed, objective lens L is set to the position where it is focused on an object in the first middle zone. This ensures satisfactory photography with proper exposure and focus for the field of an object placed at least in the first middle zone. Setting objective lens L to the position where it is focused on an object in the first middle zone, in this case, prevents the maximum permissible range for flash photography from being shorter when the sensitivity of a film in use is low or the guide number of a flash device is small.

Even with changeover switch Sw3 at terminal B and flash photography selected, on the contrary, objective lens L is accurately set to the position where it is focused on an object placed in either the near or first middle zone when a high level signal appears at either terminal Z1 or Z2. That is, when the output at terminal Z1 is at a high level, transistor Tr5 is turned on to activate electromagnet 26. Circuits 42, 43, 45, 46, 47, 48 and 49, other than OR circuit 40 and NAND circuit 41, generate low level signals, thus maintaining transistors Tr5 and Tr6 off. Further, with a high level signal appearing at terminal Z2, transistor Tr5 is maintained off, and OR circuits 40 and 48 and NAND circuit 41 generate high level signals, while the other circuits 42, 43, 45, 46, 47 and 49 generate low level signals, whereby transistor Tr7 is maintained off. However, transistor Tr6 is turned on to activate electromagnet 27.

As is clear from the above explanation, the automatic focus adjusting device for cameras according to the embodiments in FIGS. 3 through 5 has a conditional circuit including a switch changeable from a first condition to a second condition in response to flash photography setting. The conditional circuit is constructed such that it generates the first or second conditional signal when the switch is changed to the first or second condition. With the first conditional signal generated, the automatic focus adjusting device adjusts the focus position of an objective lens commensurate with a signal from a range finder device. With the second conditional signal generated, however, the automatic focus adjusting device adjusts the focus position of an objective lens commensurate with a signal equivalent to the signal corresponding to a predetermined distance within the permissible range for flash photography when the range finder device detects a signal corresponding to a distance beyond the maximum permissible range for flash photography, or the range finder device detects no signal of the distance for an object to be photographed. As a result, even when an object is located at a too distant position or an object is too dark, flash photography prevents any extreme de-focus or exposure failure for the object to be photographed, assuring appropriate focus and exposure for the field of an object placed at least in the predetermined distance within the permissible range for flash photography, whereby a generally satisfactory photograph is available.

What is claimed is:

1. In a camera which is selectively settable to a daylight photography mode and to a flash photography mode and which includes an objective and a manually operable selector for selection of the photographic modes, an automatic focus adjusting device comprising:
 range finder means for generating a distance signal representative of a distance from said camera to an object;
 objective setting means responsive to said distance signal for setting said objective at a position where said objective focuses on said object; and
 control means responsive to the selection of a photographic mode for, upon selection of the flash photography mode, causing said objective setting means to set said objective at a position where said objective focuses on an object at a predetermined distance within the maximum permissible distance for flash photography, and, upon selection of the daylight photography mode, enabling said objective setting means to set said objective in response to said distance signal.

2. An automatic focus adjusting device as in claim 1, wherein said range finder means generates a distance signal within a plurality of respective distance zones and said objective setting means includes a drive member, an objective shifting member driven by said drive member for shifting said objective lens for focusing, an electromagnetic means for each of said plurality of distance zones and being actuated for arresting said objective shifting member at a position where said objective focuses on an object located at the corresponding distance zone, and an actuating circuit for selectively actuating one of said electromagnetic means in response to said distance signal, said actuated electromagnetic means corresponding to the distance zone in which the distance represented by said distance signal falls.

3. An automatic focus adjusting device as in claim 2, wherein each of said electromagnetic means includes an electromagnet excited by said actuating circuit when the distance represented by said distance signal falls in the corresponding distance zone, and an arresting member engageable with said objective shifting member in response to excitation of said electromagnet for arresting said objective shifting member at a position where said objective lens focuses on an object at the distance zone corresponding to said excited electromagnet.

4. An automatic focus adjusting device as in claim 3, wherein said control means includes a switch interlocked with said selector and arranged for supplying electric power to said electromagnet corresponding to said predetermined distance zone while disabling said actuating circuit upon selection of the flash photography mode.

5. An automatic focus adjusting device as in claim 2, wherein said control means includes circuit means for actuating one of said electromagnetic devices corresponding to a predetermined distance zone which is within the maximum permissible distance for flash photography, in preference to the existence of said distance signal upon selection of the flash photography mode.

6. An automatic focus adjusting device as in claim 5, wherein said control means prevents said distance signal input to said actuating circuit so that none of said electromagnetic devices are actuated when the distance represented by said distance signal is farther than any of said distance zones.

7. An automatic focus adjusting device as in claim 6, wherein said objective setting means includes a stopper fixedly provided on said camera for stopping said objective lens shifting member at a position where said objective focuses on an object located at a distance zone which is farther than any of said distance zones, and wherein said drive member drives said objective shifting member in the direction in which said objective lens focuses on a farther object as said objective shifting member is driven.

8. An automatic focus adjusting device as in claim 2, wherein said control means includes a conditioning circuit for generating a conditioning signal representative of the selected photographic mode, said conditioning circuit being connected to said actuating circuit such that said conditioning signal causes said actuating circuit to actuate one of said electromagnetic devices corresponding to the predetermined distance zone which is within the maximum permissible distance for flash photography.

9. An automatic focus adjusting device as in claim 8, wherein said control means prevents said distance signal input to said actuating circuit so that none of said electromagnetic devices are actuated when the distance represented by said distance signal is farther than any of said distance zones.

10. An automatic focus adjusting device as in claim 9, wherein said objective setting means includes a stopper fixedly provided on said camera for stopping said objective shifting member at a position where said objective lens focuses on an object located at a distance zone which is farther than any of said distance zones, and wherein said drive member drives said objective shifting member in the direction in which said objective lens focuses on a farther object as said objective shifting member is driven.

11. An automatic focus adjusting device as in claim 2, further comprising a manually operable setting member for setting an exposure factor for flash photography to a plurality of different values, and wherein said control means includes a conditioning circuit responsive to both the selection of the photographic mode and the set value of said exposure factor for generating a conditioning signal representative of the selected photographic mode and the set value of the exposure factor, said conditioning circuit being connected to said actuating circuit such that said conditioning signal, upon the selection of the flash photography mode, causes said actuating circuit to selectively actuate a predetermined one of said electromagnetic devices corresponding to the distance zone within the maximum permissible distance for flash photography in accordance with the set value of said exposure factor.

12. An automatic focus adjusting device as in claim 11, wherein said exposure factor set by said setting member is film sensitivity.

13. An automatic focus adjusting device as in claim 11, wherein said exposure factor set by said setting member is the guide number of an electronic flash device to be used with said camera.

14. An automatic focus adjusting device as in claim 11, wherein said control means prevents said distance signal input to said actuating circuit so that none of said electromagnetic devices are actuated when the distance represented by said distance signal is farther than any of said distance zones.

15. An automatic focus adjusting device as in claim 12, wherein said objective setting means includes a stopper fixedly provided on said camera for stopping said objective shifting member at a position where said objective lens focuses on an object located at a distance zone which is farther than any of said distance zones, and wherein said drive member drives said objective shifting member in the direction in which said objective lens focuses on a farther object as said objective lens is driven.

* * * * *